United States Patent [19]

Thulin

[11] Patent Number: 4,752,022
[45] Date of Patent: Jun. 21, 1988

[54] LUGGAGE CARRIER FOR VEHICLES

[76] Inventor: Willis Thulin, S-330 33 Hillerstorp, Hillerstorp, Sweden

[21] Appl. No.: 506,226

[22] Filed: Jun. 22, 1983

Related U.S. Application Data

[63] Continuation of Ser. No. 304,060, Sep. 21, 1981, abandoned.

[30] Foreign Application Priority Data

Oct. 6, 1980 [SE] Sweden ............... 8006966

[51] Int. Cl.⁴ .............................................. B60R 9/04
[52] U.S. Cl. .................................... 224/314; 224/331
[58] Field of Search ............... 224/314, 309, 321, 322, 224/331, 330, 315, 323; 70/258; 248/226.2, 226.1, 226.3, 503; 220/331; 292/256.56; 108/131, 117

[56] References Cited

U.S. PATENT DOCUMENTS

| 310,158 | 12/1884 | Wagaman | 108/117 X |
|---|---|---|---|
| 1,583,695 | 5/1926 | Lane | 108/117 |
| 2,572,486 | 10/1951 | Isaac | 220/331 |
| 2,769,650 | 11/1956 | Larson | 403/93 X |
| 2,789,743 | 4/1957 | Waldman | 224/314 |
| 2,983,414 | 5/1961 | Fehr | 224/323 |
| 3,132,780 | 5/1964 | Binding | 224/323 |
| 3,525,461 | 8/1970 | Bronson | 224/315 |
| 3,638,844 | 2/1972 | Bronson | 224/323 |
| 3,837,547 | 9/1974 | Joos | 224/331 |
| 4,091,958 | 5/1978 | Zemke | 220/331 |
| 4,166,560 | 9/1979 | Werner et al. | 224/315 |

FOREIGN PATENT DOCUMENTS

| 2519772 | 11/1976 | Fed. Rep. of Germany | 224/331 |
|---|---|---|---|
| 2548675 | 5/1977 | Fed. Rep. of Germany | 224/331 |
| 2811819 | 10/1978 | Fed. Rep. of Germany | 224/331 |

Primary Examiner—Henry J. Recla
Assistant Examiner—Robert M. Petrik
Attorney, Agent, or Firm—Holman & Stern

[57] ABSTRACT

A removable luggage carrier for vehicles having a horizontal support bar and depending support legs pivotably mounted at the ends of the support bar. Each support leg has a clamp which is removably attachable to a part of the vehicle, such as a rain gutter on the roof of a car. A locking cover is pivotably mounted on each end of the support bar to secure the carrier in position when in use to prevent unauthorized removal and to allow adjustment of the support legs to a compact storing position.

10 Claims, 3 Drawing Sheets

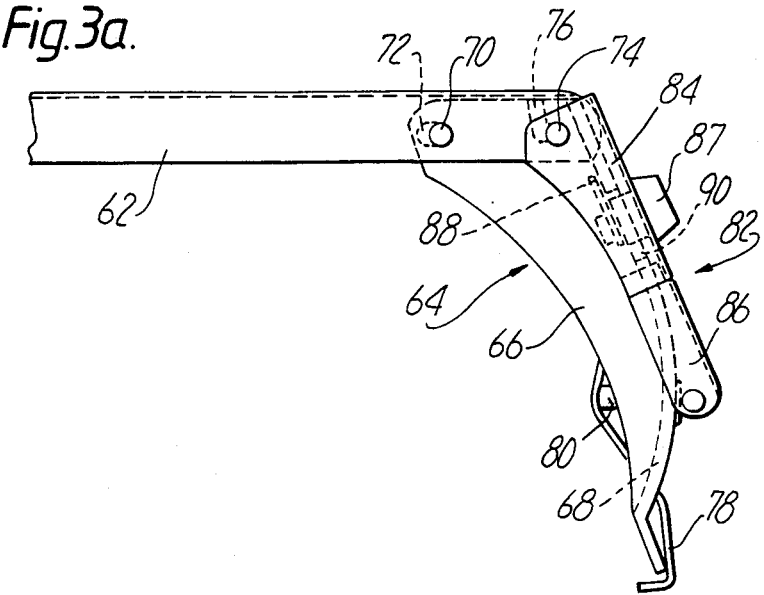
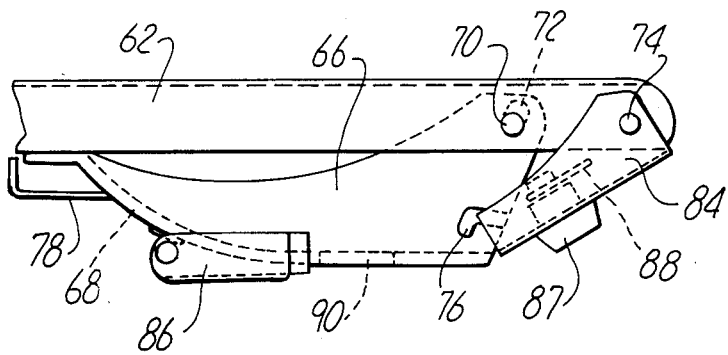

LUGGAGE CARRIER FOR VEHICLES

This is a continuation of application Ser. No. 304,060, filed Sept. 21, 1981 now abandoned.

BACKGROUND OF THE INVENTION

1. Field of the Invention

The present invention relates to a luggage carrier for vehicles, comprising a support rod and support legs connected with the ends of the support rod, each support leg having a fastening device for fastening the luggage carrier to the vehicle, preferably the rain gutters of the vehicle roof.

2. Description of the Prior Art

Luggage carriers of this kind are to an encreasing extent used for supporting and holding roof racks, ski-carriers, carriers for surf-boards and similar objects on the vehicle roofs. Such luggage carriers are a simple and advantageous means for allowing the transportation of bulky objects by mans of passenger cars.

Because of the increasing fuel costs the attention has been drawn to the increase of the air resistance and thereby of the fuel consumption which is caused by the luggage carriers. Therefore, it is important that the luggage carriers are positioned on the roofs of the vehicles only when the luggage carriers are used. Thus, it is desirable to provide a luggage carrier for vehicles which requires a small space when not being used, so that the luggage carrier constantly can be carried in the luggage compartment of the vehicle in order to be available for mounting on the roof of the vehicle only when required.

BRIEF SUMMARY OF THE INVENTION

Thus, the object of the invention is to provide a luggage carrier for vehicles which complies with said wishes for small space requirements when not being used.

In order to comply with this object the luggage carrier according to the invention is characterized in that the support legs are pivotably connected with the support rod so as to be pivoted between a space saving storage position in which the support legs are folded against the support rod and an operative position in which the support legs extend transversely of the support rod.

In a preferred embodiment of the luggage carrier according to the invention each support leg comprises a securing device for securing the support legs in their extended, operative positions.

It is previously known to provide the luggage carriers of the type described above with lockable protective devices for preventing unauthorized operation of the fastening devices and thereby for preventing an unauthorized removal of the luggage carrier from a vehicle to which the luggage carrier is fastened, and/or for preventing unauthorized removal of articles which are supported by the luggage carrier. In a specially advantageous embodiment of the luggage carrier according to the invention the protective devices are foldable against the support rod to a space saving position in said folded storage position of the support legs and the protective devices are utilized for securing the support legs in the operative, extended position.

BRIEF DESCRIPTION OF THE DRAWINGS

The invention will not be described with reference to the accompanying drawings wherein:

FIG. 3a is an elevational view of an end portion of a further embodiment of a luggage carrier according to the invention in an operative position, and FIG. 3b is an elevational view of the end portion of a luggage carrier according to FIG. 3a in an inoperative position.

DETAILED DESCRIPTION

Figure 1A:
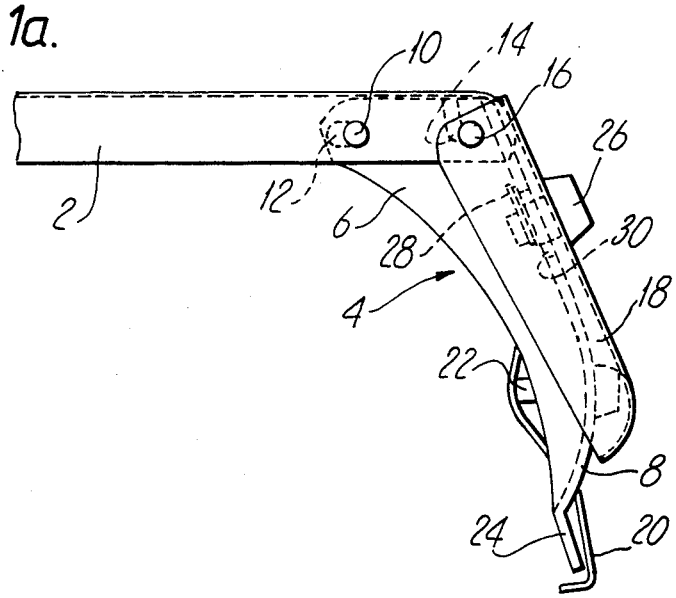
FIG. 1a is an elevational view of an end portion of an embodiment of a luggage carrier according to the invention in an operative position.

A luggage carrier according to the invention comprises a support rod and two support legs connected with the ends of the support rod. The support legs are adapted to be connected with the rain gutters of the roof of the vehicle, so that the support rod extends transversely of the roof of the vehicle. Usually a vehicle is provided with two luggage carriers which are mounted at a distance from each other in the longitudinal direction of the vehicle. Thereby, the luggage carrier can be used for supporting a roof rack, ski-carriers, carriers for surf-boards, carriers for bicycles and so on. In the figures of the drawings there is shown only one end portion of different embodiments of luggage carriers according to the invention, but it is realized that a complete luggage carrier comprises a support rod having a length corresponding to the width of a vehicle, each support rod comprising two support legs of the kind shown in the drawing.

In FIG. 1a there is shown a luggage carrier comprising a support rod 2 having a U-shaped, downwardly open cross-section. To the end of the support rod 2 shown in the figure there is connected a support leg 4 having a substantially U-shaped cross-section including side walls 6 and an end wall 8. Each side wall 6 is connected with the support rod 2 by means of pivot pins 10 (only one is visible in the figure), each pin 10 extending through a slot-shaped opening 12 in the side walls 6 and through holes in the support rod 2. At its side walls 6 the support leg 4 is formed with L-shaped slots 14. The L-shaped slots receive pivot pins 16 which are connected with the support rod 2 and also have the object of pivotably supporting a protective cover 18. At its lower end the support leg 4 has a fastening device consisting of a hook 20 and a clamping bolt 22. The support leg 4 has an end portion 24 which is adapted to engage a rain gutter at the side of a roof of a vehicle, while the hook 20 is adapted to engage with the lower side of the rain gutter in order to secure the support leg thereto. By means of the clamping bolt 22 it is possible to fasten the support leg 4 to the rain gutter.

In the position of the protective cover 18 shown in FIG. 1a the protective cover covers the clamping bolt 22, which makes it possible to prevent unauthorized removal of the luggage carrier from the roof of the vehicle. The protective cover 18 carries a lock 26 having a rotatable locking element 28 which is adapted to engage the inner surface of the end wall 8 of the support leg 4 through an opening 30 formed therein.

Because of the fact that the pivot pins 16 are positioned in the horizontal portion of the L-shaped slots 14 according to FIG. 1a the support leg 4 cannot be pivoted around the pivot pins 10 but is secured in the position shown in FIG. 1a. A displacement of the support leg 4 in the longitudinal direction of the support rod 2, i.e. in the longitudinal direction of the slot-shaped openings 12 and the horizontal portions of the L-shaped slots 14, is prevented by the fact that the upper portion of the end wall 8 of the support leg 4 is confined between the end surface of the support rod 2 and the adjacent inner surface portion of the upper portion of the protective cover 18.

Figure 1B:
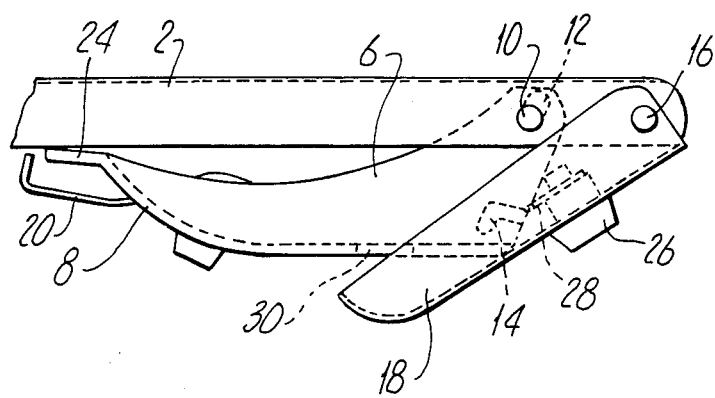
FIG. 1b is an elevational view of the end portion of a luggage carrier according to FIG. 1a in an inoperative position.

When the lock 26 is unlocked by turning the locking element 28 away from the engagement with the inner surface of the end wall 8 of the support leg 4, the protective cover 18 can be pivoted to a position making it possible to loosen the clamping bolt 22 and to remove the luggage carrier from the roof of the vehicle. In the upper position of the protective cover 18 the support leg 4 is displacable to the right as viewed in FIG. 1a, the pivot pin 16 thereby entering the vertical portion of the L-shaped slots 14 making it possible to pivot the support leg in the clockwise direction around the pivot pin 10 while the pivot pin 16 is disengaged from the L-shaped slot 14. The support leg 4 and the protective cover 18 can be pivoted to the position shown in FIG. 1b, that is against the support rod 2, in which the luggage carrier adopts a space-saving storage position.

Figure 2A:
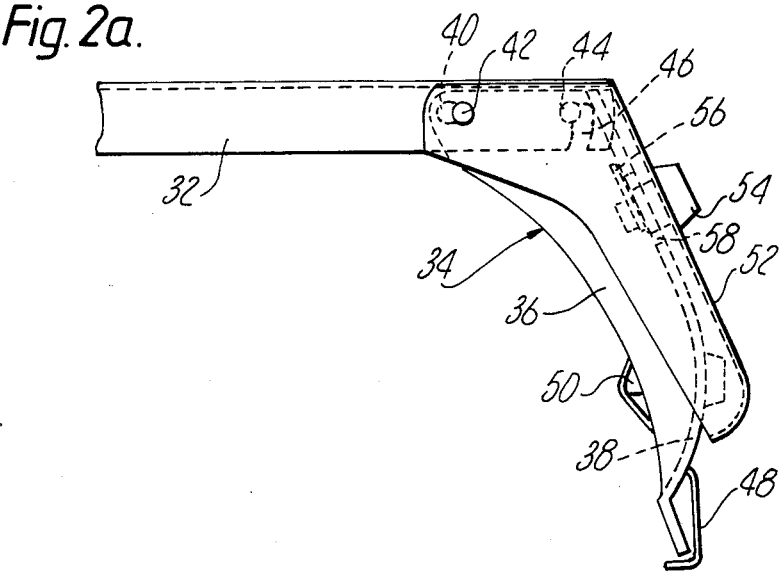
FIG. 2a is an elevational view of an end portion of another embodiment of a luggage carrier according to the invention in an operative position.
Figure 2B:
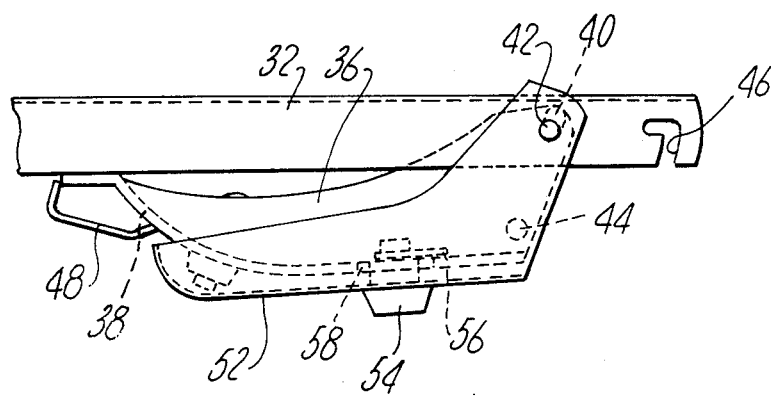
FIG. 2b is an elevational view of the end portion of a luggage carrier according to FIG. 2a in an inoperative position.

In FIGS. 2a and 2b there is shown a modified embodiment of a luggage carrier according to the invention. The luggage carrier comprises a support rod 32 having a U-shaped, downwardly open cross-section and a support leg 34 connected with the support rod and comprising two side walls 36 and an end wall 38. The support leg 34 is formed with slot-shaped openings 40 receiving pivot pins 42 connected with the support rod 32. The support leg 34 has locking pins 44 connected at their ends thereto and engaging L-shaped slots 46 in the support rod 32. In the position shown in FIG. 2a the locking pins 44 engage the horizontal portions of the L-shaped slots 46, so that the support leg 34 is secured against rotation around the pivot pins 42. At its lower end the support leg 34 has a fastening device comprising a hook 48 and a clamping bolt 50. The fastening device acts in the same way as the fastening device which is shown in FIG. 1a and comprises the hook 20 and the clamping bolt 22.

A protective cover 52 is pivotably journaled on the ends of pivot pins 42 and has the object of protecting the clamping bolt 50 with regard to unauthorized operation for removing the luggage carrier. Like the protective cover 18 in the luggage carrier according to FIGS. 1a and 1b the protective cover 52 comprises a lock 54 which by means of a locking element 56 extends through an opening 58 in the end wall 38 of the support leg 34 for engaging in its locked position the inner surface of the end wall 38.

An upper portion of the end wall 38 engages between an end surface of the support rod 32 and the adjacent inner surface of the protective cover 52 so that the support leg 34 is retained in the position shown in FIG. 2a, wherein the locking pins 44 engage the horizontal portion of the L-shaped slots 46 and the support leg 34 is in a fixed position.

When the lock 54 is opened and the protective cover 52 is rotated upwards the support leg 34 can be displaced to the right in the figure to the position, in which the locking pins 44 engage the vertical portion of the L-shaped slots 46 and the support leg 34 can be pivoted in the clockwise direction to the retracted position shown in FIG. 2b. Also the protective cover 52 can be pivoted in the clockwise direction to a retracted, space-saving position.

In FIGS. 3a and 3b there is shown a further embodiment of a luggage carrier according to the invention. The luggage carrier comprises a support rod 62 and a support leg 64. The support rod 62 has a U-shaped, downwardly open cross-section. The support leg 64 has side walls 66 and an end wall 68. As in the embodiment according to FIGS. 1a and 1b also the support leg 64 in the embodiment according to FIGS. 3a and 3b is connected with the support rod by means of pivot pins 70 and slot-shaped openings 72. Pivot pins 74 on the support rod engage L-shaped slots 76 in the support leg. The support leg 64 comprises a fastening device consisting of a hook 78 and a clamping bolt 80 for fastening the luggage carrier to the roof the a vehicle. The luggage carrier comprises a protective cover 82 consisting of two portions, an upper portion 84 which is pivotably connected with the pivot pins 74 and a lower portion 86 which is pivotally connected with the head of the clamping bolt 80. In the position shown in FIG. 3a the upper portion 84 of the protective cover 82 engages the lower portion 86 of the protective cover 82 by means of overlapping sections in such a way that the portion 86 is locked for preventing operation of the clamping bolt 80. As in the embodiments according to FIGS. 1 and 2 also the protective cover 82 comprises a lock 87 having a locking element 88 engaging the inner side of the support leg 68 through an opening in the end wall 68 of the support leg 64.

The support leg 64 has an upper portion which is positioned between an end surface of the support rod 62 and the adjacent inner surface portion of the upper portion 84 of the protective cover 82 in order to retain the support leg 64 in a position in which the pivot pins 74 engage the horizontal portion of the L-shaped slots 76 and a pivotal movement of the support leg 64 is thereby prevented.

When the lock 87 is unlocked and the portion 84 of the protective cover 82 is pivoted upwards the portion 86 is released for allowing the clamping bolt 80 to be untightened. The support leg 64 can be displaced to the right FIG. 3a, the pivot pins 74 thereby engaging the vertical portion of the L-shaped slots 76 in turn allowing the support leg 64 to be pivoted in the clockwise direction to the retracted position shown in FIG. 3b. Also the portions 84 and 86 of the protective cover 82 take a retracted space saving position according to FIG. 3b.

The invention can be modified within the scope of the following claims.

I claim:

1. A removable luggage carrier for vehicles comprising a support rod, a support leg pivotably connected to each end of said support rod for pivotable movement between an extended operative position in use wherein said legs extend transversely with respect to said support rod and a compact space saving position for storage wherein said legs lie substantially alongside said support rod, a releasable fastening means operably mounted on each support leg comprising a hook and clamping member for displacing said hook to clamp said carrier to a vehicle, securing means for each support leg for releasably securing said support leg against said pivotable movement in its extended operative position irrespective of whether the carrier is mounted on a vehicle, a protective member pivotably mounted on said support rod, and means for releasably locking said protective member in engagement with said support leg to prevent movement thereof and adapted to prevent unauthorized release of said fastening means.

2. A removable luggage carrier for vehicles comprising a support rod, a support leg pivotally connected to each end of said support rod for pivotable movement about a pivot axis displaceable in the substantially longitudinal direction of said support rod, between an extended operative position in use wherein said legs extend transversely with respect to said support rod and a compact space saving position for storage wherein said legs lie substantially along side said support rod, a releasable fastening means operably mounted on each support leg for fastening said carrier to a vehicle, and securing means for each support leg for releasably securing said support leg against said pivotable movement in its extended operative position comprising at least one L-shaped slot on said support leg, said L-shaped slot having a first leg extending substantially parallel to the direction of displacement of said axis, and a second leg extending from said first leg to the outer periphery of said support leg, and a locking pin mounted on said support rod substantially transversely to said slot to be removably slidably engageable therein, so that said support leg can be adjusted into the operative position for use by pivotal movement about said axis to engage said locking pin in said second leg of said slot and further movement in said direction of displacement of said axis to engage said locking pin in said first leg of said slot to thereby prevent rotation of said support leg.

3. A luggage carrier as claimed in claim 2 wherein said securing means further comprises a protective member pivotably mounted on said support rod and releasably lockingly engageable with said support leg when in the extended operative position to prevent movement thereof.

4. A luggage carrier as claimed in claim 3 wherein said protective member comprises a locking arm and a locking means mounted on said locking arm releasably engaging said support leg to lock said locking arm to said support leg in the extended operative position to prevent unauthorized removal of said carrier from the vehicle.

5. A luggage carrier as claimed in claim 4 wherein said locking arm is pivotable in the direction of said pivotable movement of said support leg to said storage position.

6. A luggage carrier as claimed in claim 5 wherein said locking arm is pivotably mounted on said locking pin.

7. A luggage carrier as claimed in any one of claims 4, 5 or 6 and further comprising a part on said supporting leg confined between an adjacent end portion of said supporting rod and said adjacent locking arm when in said extended operative position.

8. A luggage carrier as claimed in any one of claims 4, 5, or 6 wherein said locking arm comprises a first part pivotably connected to said support rod and a second part connected to said releasable fastening means to operate it, and means on one of said parts to operably engage the other part in the locking position to prevent said second part from operating to release said fastening means.

9. A luggage carrier as claimed in claim 5 wherein said support rod comprises an elongated inverted U-shaped channel member, each support leg depends from an end of said channel member with its upper ends disposed within the channel, said displaceable pivot axis comprises a slot in said support leg extending substantially in the longitudinal direction of said support rod, and a pivot pin mounted at its ends in the depending legs of said support rod and extending through said slot, said second leg of said L-shaped slot extends upwardly from the end of said first leg, and said locking means comprises an opening in the depending portion of said support leg, a locking shaft rotatably mounted on said locking arm and insertable through said opening, a locking tab fixedly mounted on the end of said lock shaft, said opening and locking tab having cooperating shapes so that in the unlocked position of rotation of said lock said lock shaft and tab will pass through said opening and in the locked position of rotation of said lock said locking tab engages the inner surface of said support leg on the side remote from said locking arm, and a lock to prevent rotation of said locking shaft in the locked position.

10. A removable luggage carrier for vehicles comprising a support rod, a support leg pivotally connected to each end of said support rod for pivotable movement about a pivot axis displaceable in the longitudinal direction of said support rod between an extended operative position in use wherein said legs extend transversely with respect to said support rod and a compact space saving position for storage wherein said legs lie substantially along side said support rod, a releasable fastening means operably mounted on each support leg for fastening said carrier to a vehicle, and securing means for each support leg for releasably securing said support leg against said pivotable movement in its extended operative position comprising at least one L-shaped slot in said support rod having a first leg extending substantially parallel to the direction of displacement of said axis, and a second leg extending from said first leg to the outer periphery of said support rod, and a locking pin mounted on said support leg substantially transversely to said slot to be removably slidably engageable therein, so that said support leg can be adjusted into the operative position for use by pivotal movement about said axis to engage said locking pin in said second leg of said slot and further movement in said direction of displacement of said axis to engage said locking pin in said first leg of said slot to thereby prevent rotation of said support leg.

* * * * *